US 11,129,226 B2

(12) United States Patent
Boccon-Gibod et al.

(10) Patent No.: US 11,129,226 B2
(45) Date of Patent: Sep. 21, 2021

(54) POLICY-BASED CONNECTION MODIFICATION

(71) Applicant: Fitbit, Inc., San Francisco, CA (US)

(72) Inventors: Gilles Luc Jean Francois Boccon-Gibod, San Francisco, CA (US); Andrew Scott Branscomb, San Francisco, CA (US); Irvin Owens, Alameda, CA (US); Hsiao-Kai Wang, San Carlos, CA (US); Sylvain Pierre Christophe Rebaud, San Francisco, CA (US); Samuel Cordes Vaughan, Arlington, MA (US)

(73) Assignee: Fitbit, Inc., San Francisco, CA (US)

( * ) Notice: Subject to any disclaimer, the term of this patent is extended or adjusted under 35 U.S.C. 154(b) by 0 days.

(21) Appl. No.: 16/867,852

(22) Filed: May 6, 2020

(65) Prior Publication Data

US 2021/0059001 A1     Feb. 25, 2021

Related U.S. Application Data

(63) Continuation of application No. 16/867,346, filed on May 5, 2020.
(Continued)

(51) Int. Cl.
*H04W 76/23* (2018.01)
*H04W 4/70* (2018.01)
(Continued)

(52) U.S. Cl.
CPC ............. *H04W 76/23* (2018.02); *H04W 4/20* (2013.01); *H04W 4/80* (2018.02); *H04W 8/005* (2013.01); *H04W 76/14* (2018.02); *H04W 84/20* (2013.01)

(58) Field of Classification Search
CPC ... H04W 12/005; H04W 12/02; H04W 4/005; H04W 4/70; H04W 76/12; H04W 76/32;
(Continued)

(56) References Cited

U.S. PATENT DOCUMENTS 7,043,467 B1    5/2006    Milito
8,824,546 B2    9/2014    Coulombe
(Continued)

OTHER PUBLICATIONS

Non-Final Office Action received in U.S. Appl. No. 16/867,346, dated Jan. 25, 2021.
(Continued)

*Primary Examiner* — Philip Sobutka
(74) *Attorney, Agent, or Firm* — Dority & Manning, P.A.

(57) ABSTRACT

Two devices can be connected for communication by a wireless connection, where those devices will function as master and slave devices with respect to that connection. A slave device to a connection can perform changes to the connection on behalf of an application, subsystem, or other such source on either the slave device or a master device. These changes can include changes to connection parameter values, or can include state changes such as to perform a disconnect action. Enabling the slave device to perform these actions can help to bypass any restrictions that would otherwise prevent these actions being performed from a master device to the connection.

20 Claims, 7 Drawing Sheets

Related U.S. Application Data (60) Provisional application No. 62/890,887, filed on Aug. 23, 2019.

(51) Int. Cl.
  *H04W 84/18* (2009.01)
  *H04W 4/80* (2018.01)
  *H04W 4/20* (2018.01)
  *H04W 76/14* (2018.01)
  *H04W 8/00* (2009.01)
  *H04W 84/20* (2009.01)

(58) Field of Classification Search
  CPC ..... H04W 84/18; H04W 84/20; H04W 8/005; H04W 4/20; H04W 4/80; H04W 76/14; H04W 76/23
  See application file for complete search history.

(56) References Cited

U.S. PATENT DOCUMENTS

| | | |
|---|---|---|
| 2003/0053481 A1 | 3/2003 | Abiru |
| 2005/0102525 A1 | 5/2005 | Akimoto |
| 2006/0039349 A1 | 2/2006 | Samuel |
| 2016/0173450 A1* | 6/2016 | Mircescu ............ H04L 63/1408 726/14 |
| 2016/0381633 A1 | 12/2016 | Chen |
| 2017/0063690 A1 | 3/2017 | Bosshart |
| 2017/0187828 A1 | 6/2017 | Soji |
| 2017/0257372 A1* | 9/2017 | Meriac ................. G06F 9/4418 |
| 2017/0295083 A1 | 10/2017 | Brooks |
| 2019/0033845 A1 | 1/2019 | Cella |
| 2019/0045427 A1 | 2/2019 | Logan |

OTHER PUBLICATIONS

Non-Final Office Action received in U.S. Appl. No. 16/803,660, dated Dec. 24, 2020.

\* cited by examiner

POLICY-BASED CONNECTION MODIFICATION

CROSS-REFERENCE TO RELATED APPLICATIONS

This application is a continuation of U.S. Non-Provisional patent application Ser. No. 16/867,346 filed May 5, 2020, and entitled "Connection Management Techniques" which claims priority to Provisional Patent Application No. 62/890,887, filed Aug. 23, 2019, and entitled "Communication and Connection Techniques," all of which are hereby incorporated herein by reference in their entirety and for all purposes. This application is related to U.S. patent application Ser. Nos. 16/803,660 and 16/803,675, which also claim priority to Provisional Application No. 62/890,887.

BACKGROUND

Wireless communication capability is increasingly being incorporated into a variety of devices. A given device might be able to communicate with a number of other devices using a number of different communication protocols. Some of these devices may be small footprint or limited capability devices that are only able to use transmission protocols with limited bandwidth or security. Further, in some situations it may be difficult to communicate with a number of devices concurrently using the same protocol. There may also be limitations on the use or modification of these communication channels.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for the management of communications between devices. In some embodiments, a slave device to a wireless connection can perform changes to the connection on behalf of an application, subsystem, or other such source on either the slave device or a master device. These changes can include changes to connection parameter values, or can include state changes such as to perform a disconnect action. Enabling a slave device to perform such actions can help to bypass any restrictions that might otherwise prevent these actions being performed from a master device to the connection.

Various other functions can be implemented within the various embodiments as well as discussed and suggested elsewhere herein.

Figure 1:
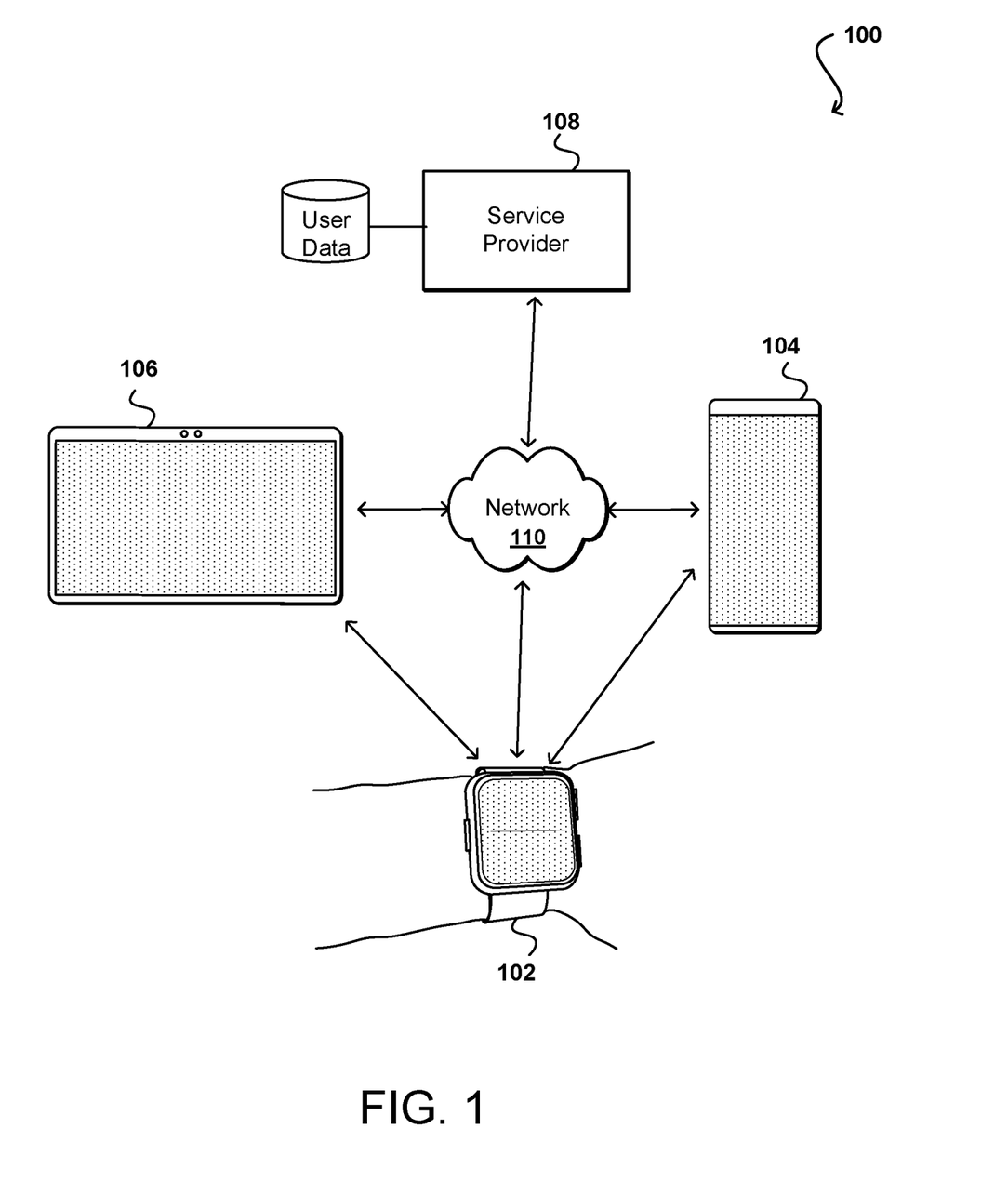
FIG. 1 illustrates an example environment in which aspect of various embodiments can be implemented.

FIG. 1 illustrates an example environment 100 in which aspects of various embodiments can be implemented. In this example, a user might have a number of different devices that are able to communicate using at least one wireless communication protocol. In this example, the user might have a smartwatch 102 or fitness tracker, which the user would like to be able to communicate with a smartphone 104 and a tablet computer 106. The ability to communicate with multiple devices can enable a user to obtain information from the smartwatch 102, such as heart rate data captured using a sensor on the smartwatch, using an application installed on either the smartphone 104 or the tablet 106. The user may also want the smartwatch 102 to be able to communicate with a service provider 108, or other such entity, that is able to obtain and process data from the smartwatch and provide functionality that may not otherwise be available on the smartwatch or the applications installed on the individual devices. The smartwatch may be able to communicate with the service provider 108 through at least one network 110, such as the Internet or a cellular network, or may communicate over a wireless connection such as Bluetooth® to one of the individual devices, which can then communicate over the at least one network. There may be a number of other types of, or reasons for, communications in various embodiments.

In addition to simply being able to communicate, the user may also want the devices to be able to communicate in a number of ways or with certain aspects. For example, the user may want communications between the devices to be secure, particularly where the data may include personal health data or other such communications. The device or application providers may also be required to secure this information in at least some situations. The user may want the devices to be able to communicate with each other concurrently, rather than sequentially. This may be particularly true where pairing may be required, as the user may prefer that each device be paired at most once, or that not manual pairing is required. The user may also desire the communications to be as standards-based as possible, not only so that little manual intervention is required on the part of the user but also so that the devices can communicate with as many other types of devices as possible, which is often not the case for various proprietary formats. A user may thus desire to be able to walk in a room with one device and have it automatically be able to communicate with another target device with little to no effort on the part of the user.

In various conventional approaches, a device will utilize a communication technology such as Wi-Fi to communicate with other devices using wireless local area networking (WLAN). Smaller or lower capacity devices, such as many Internet of Things (IoT) devices, instead utilize a communication technology such as Bluetooth®, and in particular Bluetooth Low Energy (BLE) that has very low power consumption. In order to achieve this low rate of power consumption with respect to technologies such as Wi-Fi, however, BLE has relatively limited transmission range, bandwidth, and data transmission capabilities. BLE was designed to send small packets or "chunks" of data, such as for data captured by a sensor on an IoT device. For the smartwatch 102 of FIG. 1, BLE can be used to transmit information, such as user heart rate data captured by at least one sensor (or other such mechanism) in the smartwatch, to the user's smartphone 104 for tracking or other such usage. It may be desirable to transmit this information to the larger and more powerful smartphone for a number of different reasons, such as improved analysis capability and storage capacity, and ability to transmit over a network to a service provider 108, among other such options.

Figure 2:
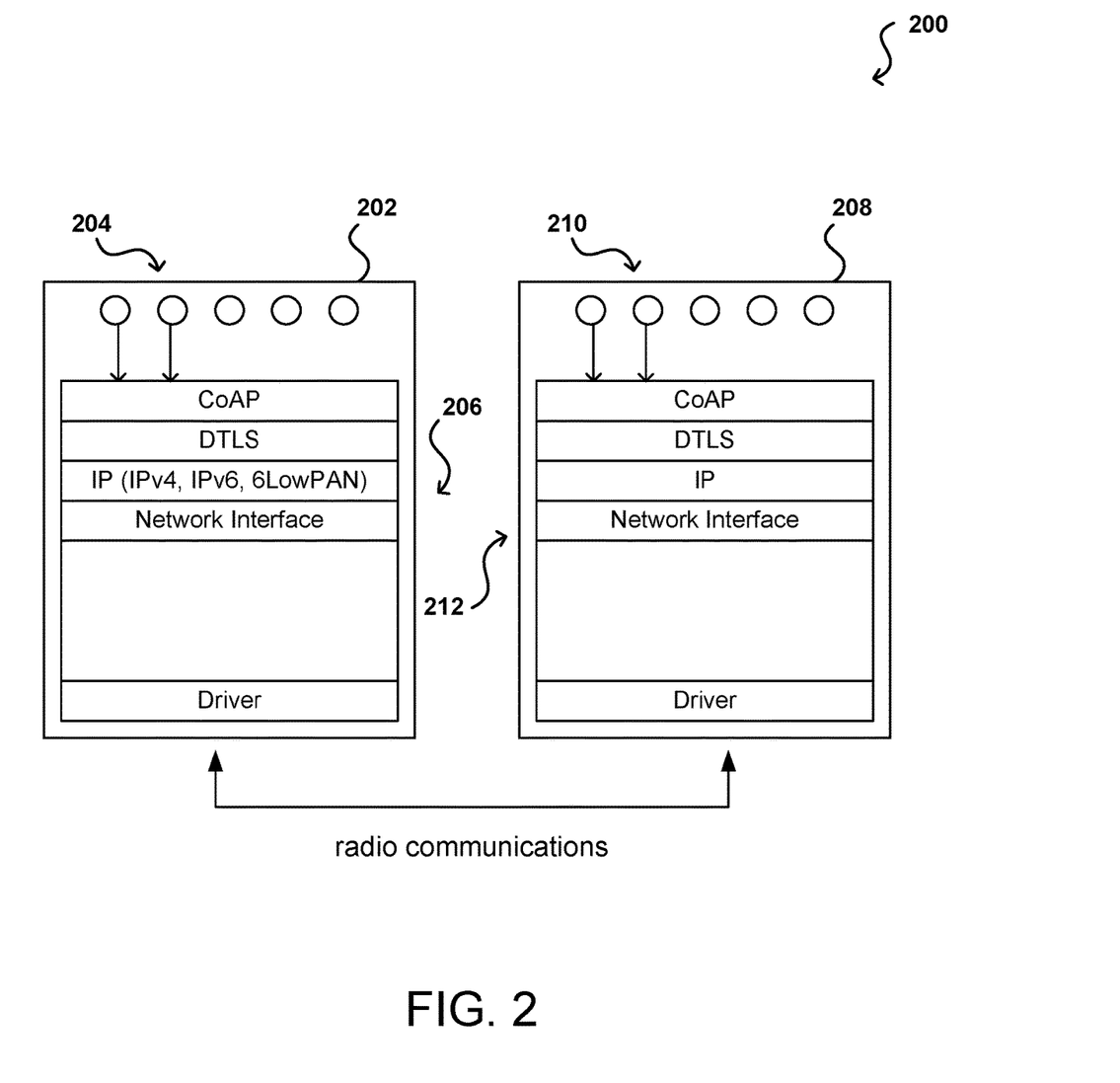
FIG. 2 illustrates an example set of devices that are able to communicate in accordance with various embodiments.

FIG. 2 illustrates an example configuration 200 wherein a first device 202 is able to communicate with a second device 208 using radio communications, in accordance with at least one embodiment. In this example, the radio communications can utilize a technology such as Bluetooth for bi-directional data transfer. The devices can connect and communicate via Bluetooth using a conventional discover and pair approach in at least one embodiment. Applications on the first device 202 that want to communicate with the second device 208 can send a request, for example, through one or more application programming interfaces (APIs) 204 to a network stack on the device. In this example, the devices communicate using a low power, lossy network (a "constrained" network) such that a protocol such as the Constrained Application Protocol (CoAP) can be used for a service layer of the stack. A protocol such as CoAP is well suited for Internet communications, and can provide aspects such as low overhead, multicast support, and simplicity of operation that are advantageous for IoT and other such devices. CoAP is able to run on devices that support the User Datagram Protocol (UDP). The CoAP layer in this example sits on a Datagram Transport Layer Security (DTLS) protocol layer that can provide security for communications from the applications 204 using, for example, Transport Layer Security (TLS). Other standards-based protocols can be used as well in other embodiments. DTLS utilizes UDP communications in at least some embodiments. Many conventional IoT devices utilize DTLS as the security protocol for CoAP communications. The CoAP or other application protocol layer can sit on a routing layer, which in this case is an Internet Protocol routing layer. The protocol may be IPv4 or IPv6 in some embodiments, which provides identification and location support for devices on an IP-based network, which can be used to route communications and data traffic across that network. In at least one embodiment IPv6 over Low-Power Wireless Personal Ares Networks (6LowPAN) can be used to allow lower power and/or capacity devices to transmit information wirelessly using IP. Other technologies such as ZigBee can be used as well in other embodiments. The routing layer can sit on a network interface layer, such as may include interfaces for networks of communications such as Wi-Fi, Ethernet, Bluetooth, and the like. Communications passing through the stack 206 on the first device 202 can be sent over a radio communications channel, such as Bluetooth, and received to a second device 208. The communication will pass through a similar stack 212 on the second device 208 to be received to one or more applications executing on the second device 208. The applications on the second device can use one or more APIs 210 to access the stack. As illustrated in FIG. 2, the stacks and corresponding configuration on the devices are symmetric so that either device can make a request to the other device without either device acting in a master or slave role. While proprietary technologies can be used as well for any of the components illustrated, such approaches can be costly and not widely adopted or trusted, such that in at least one embodiment an attempt is made to use standards-based technologies where appropriate.

In at least one embodiment, the IP layer of the stack is a local IP stack that can send IP packets through the respective network interface. The network interface takes the IP packet and sends it through a transport, which in this case relates to Bluetooth communications. There may be a Bluetooth stack on the device as well, and an operating system on the device may expose an API (not illustrated) to access the Bluetooth functionality. The driver layer in this example may include or expose an API for accessing Bluetooth or other radio functionality.

In a conventional approach, a General Attribute Profile (GATT) API is utilized that defines the way in which two BLE devices transfer data using services and characteristics. GATT communications are considered to be exclusive, in that a BLE device can only be connected to a single device, such as a smartphone or tablet, at any given time. As soon as a BLE device connects to another device, that BLE device will stop advertising such that other devices will not be able to discover and connect with the BLE device until an existing connection to the single device (e.g., smartphone) is broken. GATT uses services to break data into logic entities and contain specific chunks of data or "characteristics." Each characteristic can encapsulate a single data point, which may correspond to an array of related data in some instances. Services and characteristics are all associated with individual identifiers, such as unique UUIDs, which can each be 16-bit for BLE services. Characteristics can also have values associated therewith that indicate permissions for the value, such as whether it can be read or written.

A GATT packet will have a maximum size, such as is specified by the Maximum Transmission Unit (MTU). The implementation of the Bluetooth stack can be a key factor in determining the GATT MTU on the various devices in at least some embodiments. The MTU in various Bluetooth-based embodiments is a value that is at least 23 bytes in length. Thus, when data is received to be transmitted, the data must be broken into chunks so it can be transmitted in packets that are, at most, of the MTU in size. It should be noted that some of the length of the packet corresponds to header information that is to be used for routing, as well as for reassembling the data from the packets received on the other device.

Figure 3:
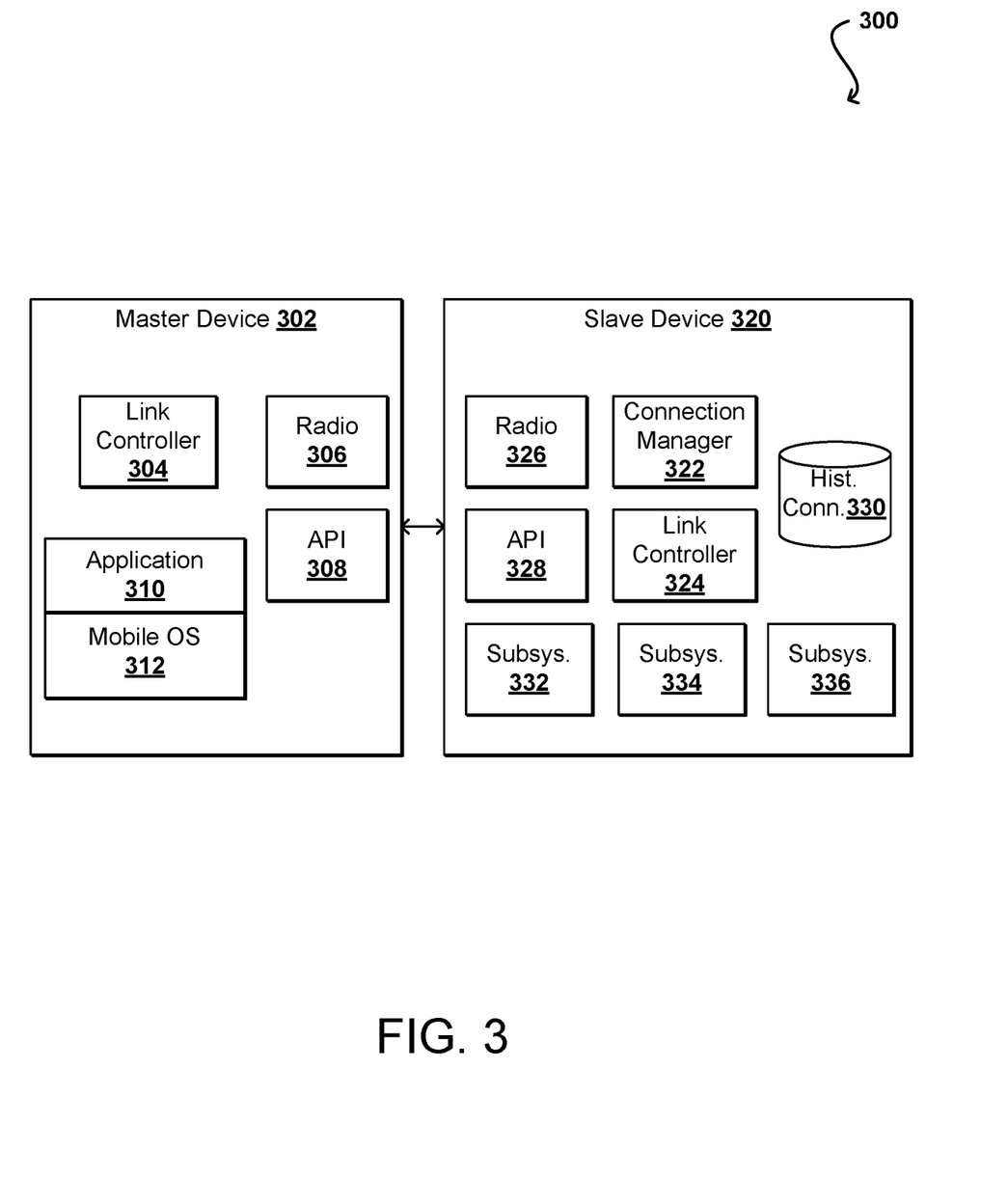
FIG. 3 illustrates an example architecture for managing connection parameters that can be utilized in accordance with various embodiments.

In at least some embodiments, it may be desirable to control parameters of a wireless connection between two devices, such as between a master device 302 and a slave device 320 as illustrated in an example architecture 300 of FIG. 3. In at least one embodiment, the master device 302 may be a mobile device, such as a smartphone, and the slave device 320 can be a device such as a smartwatch or fitness tracker. In at least some embodiments, this wireless connection can be a connection conforming to a Bluetooth® standard. During operation, there may be times when there are heavy communication loads and when there are light communication loads, or where the optimal parameters of the connection may otherwise vary. In many embodiments it can be desirable to control these connection parameters in order to optimize the connection, such as to minimize power consumption while maximizing performance. Unfortunately, the ability to control or change these connection parameters from an application or other source on a master device 302 can be limited.

Accordingly, approaches in accordance with various embodiments provide for control or management of connection parameters from the device side, or from a slave device 320. In at least one embodiment, this may include enabling a slave device (at least from a connection perspective) such as a smartwatch to control parameters of a wireless connection, such as a Bluetooth® connection, with a master device 302, such as a smartphone or other mobile computing device. In at least one embodiment the connection parameters can be negotiated dynamically between these devices. This can include, for example, determining a value for a connection interval, where shorter connection intervals can result in faster data transfer between these devices but at the expense of, for example, higher power consumption. In at least one embodiment, at each connection interval a radio amplifier is powered and one or more packets can be transmitted. Various other parameter values can be negotiated as well, as may relate to maximum packet size for transmission or other such values. In various embodiments there may be sets of parameter values that can be selected, as may relate to a "fast" connection or a "slow" connection based upon needs of one or more of these devices 302, 304.

In various embodiments, initial connection parameters can be negotiated or otherwise selected when these devices establish a connection. In some embodiments, there may be a default set of connection values for this connection that are set at this initial connection time. In at least some embodiments, during connection both the master device 302 and the slave device are able to attempt to renegotiate these connection parameters. These parameters may be adjusted for various purposes, such as to ensure compatibility, improve communication throughput, or optimize power efficiency. The same connection parameter values will not be optimal for all device pairings in many cases, as there can be different versions of operating systems 312, different radios 306, 326, and different drivers, among other such variances. In at least some embodiments, it can be desirable to determine optimal parameter sets for a specific pairing, and there may be different optimal parameter sets (or values) for different operating conditions or states. In at least one embodiment, it can be desirable to control values of various connection parameters dynamically, and as granular as possible.

Approaches in accordance with various embodiments can control these connection parameters dynamically from a slave device 320, as an ability to modify these parameters from a master device 302 can be limited. Negotiation can be driven by a connection manager 322 and/or link controller 324 on the slave device 320. Such an approach can provide a single point of control on the slave device that can determine, for any given point in time, which connection parameters the device should attempt to renegotiate. In at least some embodiments, a connection manager 322 on a slave device 320 can function as a central negotiator, which can determine when parameters should be changed, as well as what those new parameter values should be. In this example, a connection manager 322 can receive input from one or more sub-systems 332, 334, 336 on the slave device 320. In at least one embodiment, the connection manager 322 may also receive input from an application 310 executing on the master device 302. Each of these inputs can function as a vote for one or more connection parameter values or value sets, which may benefit each sub-system or device in some way. For example, a sub-system with a large amount of data to transfer may request a connection parameter set that results in faster data transmission capability.

In at least one embodiment, one or more subsystems can send a vote, recommendation, or request for one or more parameter values, value sets, or connection types to the connection manager 322 or another central negotiator. The connection manager 322 may utilize one or more connection policies to determine appropriate connection values to select. This can include, for example, ensuring that any parameter value selections remain within bounds of the relevant communication standard, such as to ensure compliance with Bluetooth® requirements. The relevant policy, or policies, can depend upon various factors, such as the type of connection, types of devices, operating system, and the like.

In at least one embodiment, the decision can also take historical connection information 330 into account. For standards such as the Bluetooth® standard, there can be a maximum frequency of parameter changes for a connection, or a minimum time before parameter values can be changed once negotiated and accepted. In order to ensure compliance, the connection manager 322 may utilize the prior connection data with the relevant connection policy to determine whether connection parameter values can be changed at the present time. If not, the connection manager 322 may store the requests until such time as a change can be made, then can make a decision based on either the most recent requests or any relevant requests received since the last parameter value change, among other such options. In some embodiments, the historical connection data may also include information about unsuccessful value sets or other performance information that can be used in determining a set to negotiate. For example, a sub-system might request a particular parameter value set, but if that set results in poor performance then that set may be removed from consideration, or may be given less weight than suggestions or votes from other subsystems.

In some embodiments, there can be at least two parameter sets that can represent fast data transmission and slow data transmission connection states. As mentioned, there can be additional parameter sets as well that may represent different parameter values that optimize for different aspects of a connection. Since parameters can only be changed with a maximum frequency, however, it may not be beneficial to have a large number of parameter sets. While larger numbers of sets can allow for more accurate optimization at any given time, an inability to change frequently can reduce a benefit of a large number of sets. Further, if a parameter set change is made that makes little difference in performance, this may prevent a subsequent change that might make a significant difference in performance, but is not able to be made at the current time due to the prior parameter set or value change. In some embodiments there may also be a minimum confidence threshold used to make a parameter set change, as such a change cannot be undone for a period of time if incorrectly made.

As mentioned, in various embodiments there can be multiple subsystems that can provide a vote, request, or recommendation for connection parameters for an upcoming period of time. As an example of such a subsystem, a command may be received to activate voice functionality. A voice subsystem may start buffering captured audio data, and can know that the buffered data will need to transfer that data over the wireless connection. In many instances, this transfer from a slave device to a master device, such as from a smartwatch to a smartphone over a Bluetooth® connection, will require a significant amount of bandwidth. Before the buffer is full, this voice subsystem can provide a vote to the link controller 324, for example, that the subsystem would like the connection to operate with fast data transmission capability. By the subsystem voting before the buffer is full, this provides the link controller 324 with a head start to attempt to renegotiate the parameter values such that the connection parameter values will be updated and the appropriate type of connection present when needed by that subsystem.

In another example, a link controller or connection manager can take an aggregate view of the throughput for all data for all subsystems on a device, as well as incoming data to that device over a wireless connection. A link controller can measure amounts of data in one or more buffers at any point in time, and a determination can be made as to whether buffers are staying relatively full for some amount of time and are getting congested. In at least some embodiments, a threshold can be set such that if an amount of congestion meets or exceeds this threshold then a vote can be provided to the link controller that parameter values should be adjusted to improve a throughput of the connection in order to empty those buffers as quickly as possible. Such an approach can help subsystems to not have to be precise in determinations of connection parameter changes, as the buffers can be sued to determine a need for such changes. In at least one embodiment, a link controller policy may enable that link controller to automatically adjust parameter values when an amount of buffer congestion reaches a determined threshold, as long as that change remains within bounds of the connection standard.

Another example relates to actions or states determined on the master device, such as a smartphone. In at least one embodiment, a link controller 324 can reside on a slave device 320 but can receive at least one vote from the master device 302. As mentioned, a master device can have an ability to change connection parameter values, but can be limited in its ability to make these changes or at least to provide applications with an ability to request such changes. As with a prior examples, it may be determined that one or more transmission buffers are filling and this can be used to determine to request parameters associated with higher throughput, but in this example those buffers can reside on the master device. In at least one embodiment, an application or subsystem on master device 302 can remotely, over the wireless communication channel, vote into the link controller 324 that is running on the slave device 320. The link controller 324 can receive the vote and can check the policy and prior connection data and make a determination as to whether to change from a slow to a fast connection parameter set as would be performed for one or more votes coming from subsystems on the device. In at least one embodiment this vote can be treated the same as a vote coming from the slave device, while in other embodiments different votes may be given different weightings. In at least some embodiments, a link controller can monitor votes such that if a sub-system does not continue to vote for a certain type of connection, such as a fast connection, then according to the policy the link controller can cause the connection to revert back to a default or prior connection state, as may relate to a slow parameter set. In this way, subsystems do not have to continue voting or provide votes when a particular changes or set is no longer needed, but can limit their voting to only those times when a change is desired, which can reduce an amount of processing required for connection monitoring and maintenance. In this way, a subsystem that does not need to go fast any longer does not need to submit a vote to go slower, but can simply stop voting to use a fast parameter set. In some embodiments, a timer may be utilized to determine when to revert to a prior or default set once no more votes are received. A period of time or delay may be used, as buffers may be emptying, for example, but it may not be desirable to revert to a different parameter set, such as a slow connection set, right away, as the buffers might then fill again relatively quickly and there may not be an ability to quickly go to a fast connection set again due to timing restrictions and policies as discussed herein. In at least some embodiments, a subsystem utilizing the timer may submit a vote at an appropriate time to revert to the default or prior set instead of automatically reverting, in case one or more other subsystems vote for a different connection parameter set.

In at least some embodiments, a slave device can store a default set of parameters that can be used for a connection at any time. This set of parameters may be received from the master device, determined manually, or determined based on historical connection data, among other such options. In many instances a master device such as a smartphone will make connection changes as the master device will have more capacity and power, and will often be connected to the cloud. In such cases, a master device may provide the initial connection parameter values, which may have been determined using an optimization process executing on a cloud resource, such as a server in a data center, which may utilize various algorithms or machine learning to determine optimal values for this connection. Such cloud-based resources may also provide updated recommendations to the master device, which can still change the parameter values for the connection, and as appropriate can provide a new default parameter set to the slave device. In at least one embodiment, an application executing on the master device may be connected to such a cloud resource, and can vote for a change in connection parameter values based at least in part upon information received from that cloud resource. For example, a cloud resource could provide updated values for connection parameters such as connection interval, maximum transmission unit (MTU), or maximum latency (e.g., number of connection intervals without communication before disconnection). In at least one embodiment, a slow parameter set might have 120 ms for a connection interval and a slave latency of three, such that the slave can go up to three connection intervals without communicating with the master before the master will initiate a disconnect. In such an embodiment, a fast connection set might have a 15 ms connection interval with a slave latency of 0. At the connection interval, a device will activate its radio 326 and wait for a packet from the master device 302 over the connection. If there is nothing to communicate then a single, small packet may be sent back to the master in order to keep the connection active. In some embodiments, a monitoring application on the master or slave devices, or in the cloud, may determine that a current parameter set is not optimal, or that performance could otherwise be improved, and can either revert to a default parameter set or can switch to a different parameter set.

Figure 4:
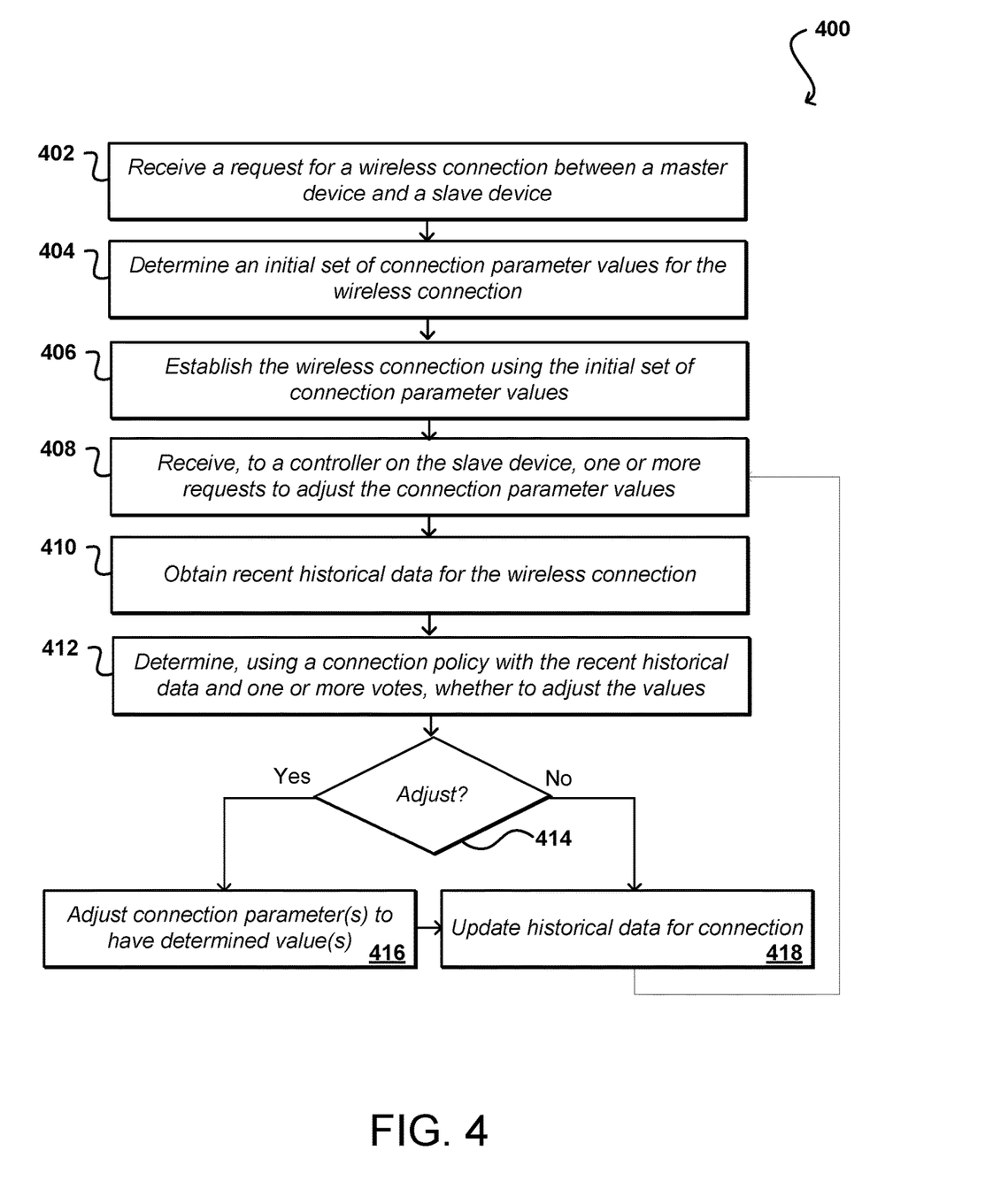
FIG. 4 illustrates an example process for managing connection parameters for wireless communication that can be utilized in accordance with various embodiments.

FIG. 4 illustrates an example process 400 for setting connection parameters that can be utilized in accordance with various embodiments. It should be understood that for this and other processes discussed herein that there can be additional, fewer, or alternative steps performed in similar or alternative order, or at least partially in parallel, within the scope of various embodiment unless otherwise specifically stated. In this example, a request is received 402 for a wireless connection between a master device and a slave device, where the request can initiate from either device. The master and slave devices can be any appropriate devices as discussed herein, as may include a smartphone and a smartwatch, respectively, capable of communicating over a wireless connection such as a Bluetooth® connection. In response to the request, an initial set of connection parameter values for the wireless connection will be determined 404, as may be based on a previously-determined default set or based on current device states, among other such options. A wireless connection can then be established 406 between the two devices using the initial set of connection parameter values. In some embodiments, these connection parameters can be used for connections between more than two devices as well.

While the connection is active, one or more requests can be received 408 to a controller on the slave device, for example, to adjust one or more connection parameter values or a value set. These requests can take the form of votes in some embodiments. Recent historical data for this wireless connection can be obtained 410, such as may be stored in a local cache and may include connection-related data for at least a determined period of the recent past. This controller can determine 412, using a policy for the connection with the recent historical data and one or more received votes, whether to adjust the connection parameter values, such as to change one or more individual values or apply a new value set. In some embodiments, this vote tally may be performed at regular intervals, as least when one or more votes are received. These votes can come from devices on the slave device or the master device in various embodiments. As mentioned, in at least some embodiments a policy may also dictate that parameter values can only be changed with up to a maximum frequency, or only after a minimum amount of time has passed since a prior change. If it is determined 414 that at least one of the connection parameters should be changed, then the appropriate value(s) should be used to adjust 416 the relevant connection parameter(s). Regardless of whether a change is made, historical data for the connection can be updated 418, such as to reflect a change or store any vote data, among other such options. The process can continue as long as the connection is active as discussed herein. In various embodiments, a master device can make connection parameter value changes as well, as may be independent from this request-based process on the slave device.

As mentioned, in at least some implementations or device selections there may be limitations on a master device that can prevent an application or subsystem on that master device from making or requesting a connection parameter value change. This might be, for example, a limitation put in place by a mobile operating system (OS) executing on a mobile device, such as a smartphone or tablet computer. There may also be components in a cloud or remote network that would like to make changes to this connection, but are restricted due at least in part to the limitations or restrictions of the OS on the master device. With conventional approaches, there is no way for such a source to request or force the master device to make such a change.

As mentioned, approaches in accordance with various embodiments can trigger connection changes from a slave device, such as a smartwatch, media player, fitness tracker, or wearable computer. When running an application on a master device with a mobile OS, such as Android or iOS, the OS may expose one or more application programming interfaces (APIs) that the application can use to connect and communicate with a slave device over a wireless connection, such as a Bluetooth® connection. While such an app on a master device may be prevented from performing tasks such as to inspect a current status of the connection or initiate changes from the master device, approaches in accordance with various embodiments enable a slave device to offer to perform at least some of these functions on behalf of the application executing on the master device, or other source operating through the master device. In such an embodiment, an application executing on the master device can submit a request to the slave device over an exposed API, instead of asking the master OS to perform that task. The request can relate to a connection change, such as a connection parameter value change, that can be made from the point of view of the slave device. The ability to allow an application on the master device to submit connection changes to the slave device can effectively bypass one or more restrictions put in place by a master device OS, particularly for those changes that can be negotiated or set from either the master or slave device on a connection. Further, a slave device is able to reflect to an application on a master device what the connection parameters and status are from the point of view of the slave device. Since the application may execute within a mobile operating system, where the operating system only exposes to the application a small subset of the connection details, such reflection enables the slave device, which can have access to all such details, to provide these details, enabling the application to effectively work around the mobile OS limitations by having the application obtain that information from the slave device.

Figure 5:
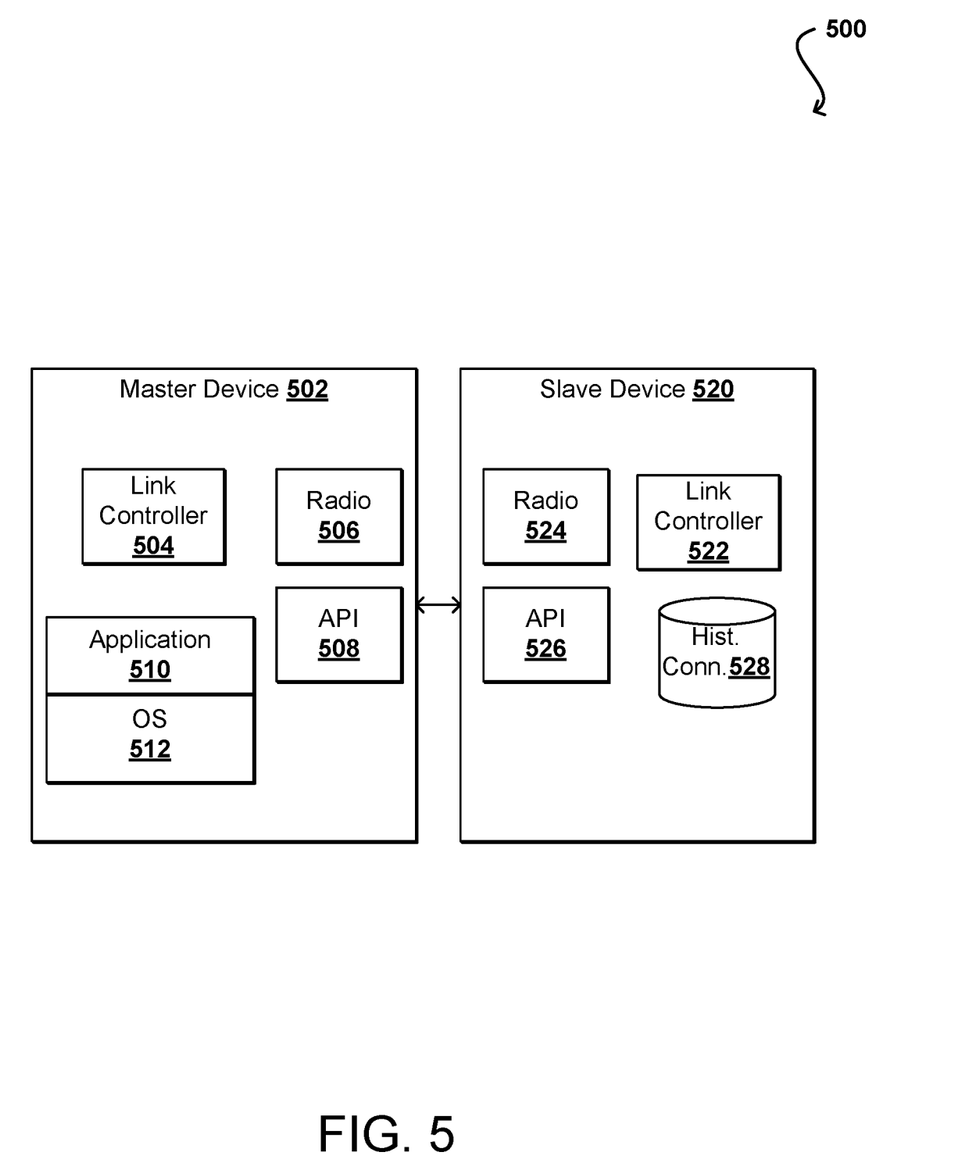
FIG. 5 illustrates an example architecture for managing a wireless connection that can be utilized in accordance with various embodiments.

In at least one embodiment, a slave device can expose a substantially complete view of connection data, at least those that are seen for the connection from the point of view of the slave device. In at least one embodiment, this set of connection data can include not only the connection parameters as discussed previously, but can also include other types of data that may not be negotiated on-the-fly, but may relate to capabilities of the connection that may be available, such as which modes can be supported by the connection. An application executing on the master device can then obtain and utilize this data from the slave device instead of attempting to obtain the device from the master OS. In at least one embodiment, one or more APIs 508, 526 can be used to enable the application 510 executing on the mobile OS (or master OS) of the master device 502 to obtain connection data from a link controller 522 on the slave device 520 as illustrated in FIG. 5. As discussed previously, each device can include a radio 506, 524 for supporting a connection as directed by respective link controllers 504, 522. When making changes to a connection parameter value, a link controller 522 on the slave device 520 can again utilize historical connection data 528 and one or more policies in making such a determination. In at least one embodiment, the request from the application 510 on the master device 502 will function as one of multiple possible votes as discussed elsewhere herein. It should be understood that a master device and a slave device are designated to have this relationship with respect to the connection, and that a master device may not have any actual control or management of the slave device. Further, the master device and slave device may be any appropriate types of devices, or the same device, and the master device may not always have more power, capacity, or computing resources than a slave device.

In at least one embodiment, the ability to submit requests from an application or subsystem on the master device to the slave device can enable other actions to be triggered as well. For example, an application 510 on the master device 502 may wish to disconnect from the slave device 520. In many implementations, the application will be unable to trigger a disconnection via the OS 512 on the master device, which can restrict such operation. In at least some implementations, the master OS 512 functions as if the master device is connected to the slave device, and then the application 510 is enabled to utilize this connection. Since the application does not own the connection, it cannot instruct the OS on the master device to disconnect, as there may be another application, subsystem, or component utilizing that connection. In a conventional system, the application 510 could indicate to the OS that the application 510 is no longer utilizing the connection, then the OS can make a determination as to whether to disconnect based on, for example, actions of other applications on the master device.

It might be the case that an application or other source on the master device 502, or on the same side of the connection as the master device, would like to force a disconnection. This might occur as a result of an error or degradation in performance, among other such options. Since this disconnect cannot be forced from the master OS side, a command or request can be sent via an API (or other interface) to the slave device 520 to ask the slave device to disconnect from its side. In at least one embodiment, the slave device may be running firmware that allows at least some of these commands received from an application on the master device to be performed, such as where those commands comply with a relevant policy and are within a set of permitted command types (or not in a set of restricted command types). In at least one embodiment, the application on the master device can perform a remote call to the slave device using a remote API 526 or remote function. In some embodiments, a cloud resource can utilize such an API or function to send commands to the slave device as well.

Figure 6:
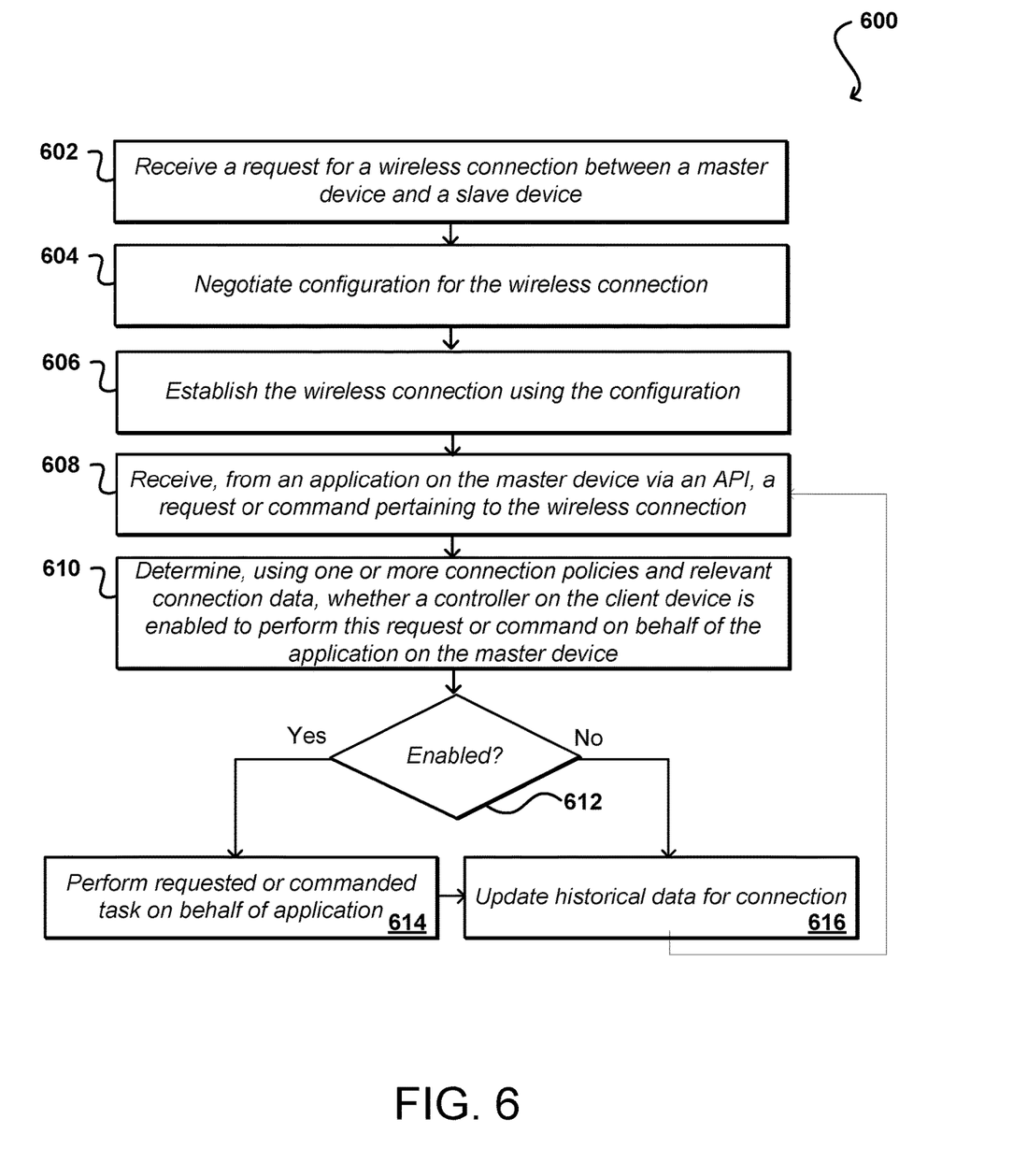
FIG. 6 illustrates an example process for managing a wireless connection that can be utilized in accordance with various embodiments.

FIG. 6 illustrates an example process 600 for managing a wireless connection that can be utilized in accordance with various embodiments. In this example, a request is received 602 for a wireless connection between a master device and a slave device, where the request can initiate from either device. In response to the request, an initial configuration is negotiated 604 for this wireless connection, such as may include an initial or default set of connection parameter values for the wireless connection. A wireless connection can then be established 606 between the two devices using the initial configuration.

While the connection is active, one or more requests or commands can be received 608 from a source, such as an application, on the master device via an API or other such interface. A request or command can be received to a controller, such as a link controller, on the slave device. The controller can then determine 610 whether to perform a tasks for these requests or commands using one or more connection policies, as well as other connection data such as historical connection data. This can include, for example, determining whether the controller on the slave device is enabled to perform this task on behalf of the application executing on the client device. As mentioned, a command may involve performing a disconnect, and there may be one or more applications or subsystems utilizing the connection that would prevent a disconnection. A request may take the form of a vote for new connection parameter values, as discussed previously, where the action can be based on a policy and the other votes. Various other tasks may be performed on behalf of an application, component, or function on, or on the side of, the master as device as would be apparent to one of ordinary skill in the art in light of the teachings and suggestions contained herein. If it is determined 612 that the controller is enabled to perform this task, and that the controller should in fact perform this task, then the requested or commanded task can be performed 614 on behalf of the application executing on the client device. Regardless of whether a change is made, historical data for the connection can be updated 616, such as to reflect a state change or store any vote data, among other such options. The process can continue as long as the connection is active as discussed herein.

As mentioned, the various embodiments can be implemented as a system that includes one or more tracking devices for a given user. In other embodiments the embodiments may be provided as a service, which users can utilize for their devices. Other tracker providers may also subscribe or utilize such a service for their customers. In some embodiments an application programming interface (API) or other such interface may be exposed that enables collected body data, and other information, to be received to the service, which can process the information and send the results back down to the tracker, or related computing device, for access by the user. In some embodiments at least some of the processing may be done on the tracking or computing device itself, but processing by a remote system or service may allow for more robust processing, particularly for tracking devices with limited capacity or processing capability.

Figure 7:
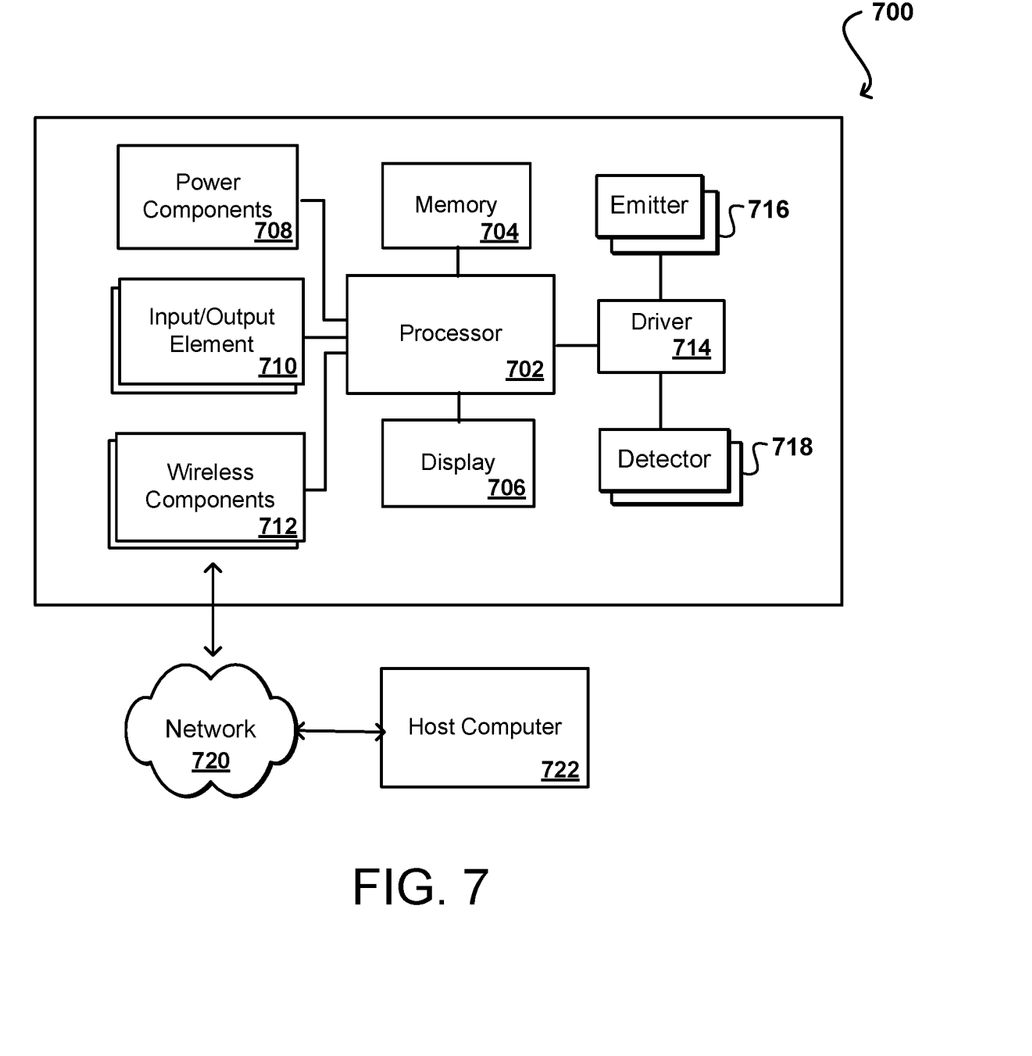
FIG. 7 illustrates an example environment in which aspects of various embodiments can be implemented.

FIG. 7 illustrates components of an example system 700 that can be utilized in accordance with various embodiments. In this example, the device includes at least one processor 702, such as a central processing unit (CPU) or graphics processing unit (GPU) for executing instructions that can be stored in a memory device 704, such as may include flash memory or DRAM, among other such options. As would be apparent to one of ordinary skill in the art, the device can include many types of memory, data storage, or computer-readable media, such as data storage for program instructions for execution by a processor. The same or separate storage can be used for images or data, a removable memory can be available for sharing information with other devices, and any number of communication approaches can be available for sharing with other devices. The device typically will include some type of display 706, such as a touch screen, organic light emitting diode (OLED), or liquid crystal display (LCD), although devices might convey information via other means, such as through audio speakers or projectors.

A tracker or similar device will include at least one motion detection sensor, which as illustrated can include at least one I/O element 710 of the device. Such a sensor can determine and/or detect orientation and/or movement of the device. Such an element can include, for example, an accelerometer, inertial sensor, altimeter, or gyroscope operable to detect movement (e.g., rotational movement, angular displacement, tilt, position, orientation, motion along a non-linear path, etc.) of the device. An orientation determining element can also include an electronic or digital compass, which can indicate a direction (e.g., north or south) in which the device is determined to be pointing (e.g., with respect to a primary axis or other such aspect). A device may also include an I/O element 710 for determining a location of the device (or the user of the device). Such a positioning element can include or comprise a GPS or similar location-determining element(s) operable to determine relative coordinates for a position of the device. Positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination. The I/O elements may also include one or more biometric sensors, optical sensors, barometric sensors (e.g., altimeter, etc.), and the like.

As mentioned above, some embodiments use the element(s) to track the location and/or motion of a user. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device. The example device also includes one or more wireless components 712 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art. The device also includes one or more power components 708, such as may include a battery operable to be recharged through conventional plug-in approaches, or through other approaches such as capacitive charging through proximity with a power mat or other such device. In some embodiments the device can include at least one additional input/output device 710 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

As mentioned, many embodiments will include at least some combination of one or more emitters 716 and one or more detectors 718 for measuring data for one or more metrics of a human body, such as for a person wearing the tracker device. In some embodiments this may involve at least one imaging element, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example device in FIG. 7 includes emitters 716 and detectors 618 capable of being used, in one example, for obtaining optical photoplethsymogram (PPG) measurements. Some PPG technologies rely on detecting light at a single spatial location, or adding signals taken from two or more spatial locations. Both of these approaches result in a single spatial measurement from which the heart rate (HR) estimate (or other physiological metrics) can be determined. In some embodiments, a PPG device employs a single light source coupled to a single detector (i.e., a single light path). Alternatively, a PPG device may employ multiple light sources coupled to a single detector or multiple detectors (i.e., two or more light paths). In other embodiments, a PPG device employs multiple detectors coupled to a single light source or multiple light sources (i.e., two or more light paths). In some cases, the light source(s) may be configured to emit one or more of green, red, and/or infrared light. For example, a PPG device may employ a single light source and two or more light detectors each configured to detect a specific wavelength or wavelength range. In some cases, each detector is configured to detect a different wavelength or wavelength range from one another. In other cases, two or more detectors configured to detect the same wavelength or wavelength range. In yet another case, one or more detectors configured to detect a specific wavelength or wavelength range different from one or more other detectors). In embodiments employing multiple light paths, the PPG device may determine an average of the signals resulting from the multiple light paths before determining an HR estimate or other physiological metrics. Such a PPG device may not be able to resolve individual light paths or separately utilize the individual signals resulting from the multiple light paths.

Referring back to FIG. 7, an example device may further comprise one or more processors 702 coupled to memory 704, a display 706, a bus, one or more input/output (I/O) elements 710, and wireless networking components 712, among other such options. A display and/or I/O devices may be omitted in certain embodiments. In an embodiment, the device is a wristband and the display is configured such that the display faces away from the outside of a user's wrist when the user wears the device. In other embodiments, the display may be omitted and data detected by the device may be transmitted using the wireless networking interface via near-field communication (NFC), Bluetooth, Wi-Fi, or other suitable wireless communication protocols over at least one network 720 to a host computer 722 for analysis, display, reporting, or other such use.

The memory 704 may comprise RAM, ROM, FLASH memory, or other non-transitory digital data storage, and may include a control program comprising sequences of instructions which, when loaded from the memory and executed using the processor 702, cause the processor 702 to perform the functions that are described herein. The emitters 716 and detectors 718 may be coupled to a bus directly or indirectly using driver circuitry by which the processor 702 may drive the light emitters 716 and obtain signals from the light detectors 718. The host computer 722 communicate with the wireless networking components 712 via one or more networks 720, which may include one or more local area networks, wide area networks, and/or internetworks using any of terrestrial or satellite links. In some embodiments, the host computer 722 executes control programs and/or application programs that are configured to perform some of the functions described herein.

In some embodiments, each emitter 716 can be individually controlled, or each light detector 718 can be individually read out when multiple detectors are used, and in such embodiments, PPG sensor data along several different light paths can be collected. The control program can utilize the collected data to provide a more accurate estimation or HR and/or other physiological metrics. In related aspects, the processor 702 and other component(s) of the PPG device may be implemented as a System-on-Chip (SoC) that may include one or more central processing unit (CPU) cores that use one or more reduced instruction set computing (RISC) instruction sets, and/or other software and hardware to support the PPG device.

In various embodiments, the emitters (or light sources) comprise electronic semiconductor light sources, such as LEDs, or produce light using any of filaments, phosphors, or laser. In some implementations, each of the light sources emits light having the same center wavelength or within the same wavelength range. In other cases, at least one light source may emit light having a center wavelength that is different from another one of the light sources. The center wavelengths of the light emitted by the light sources may be in the range of 495 nm to 570 nm. For example, a particular green light source may emit light with a center wavelength of 528 nm. In other embodiments, one or more of the light sources may emit red light (e.g., 660 nm center wavelength) or IR light (e.g., 940 nm center wavelength). In some embodiments, one or more of the light sources may emit light with peak wavelengths typically in the range of 650 nm to 940 nm. For example, in various embodiments, a particular red light source may emit light with a peak wavelength of 660 nm, and one or more infrared light sources may emit light with peak wavelengths in the range of 750 nm to 1700 nm. By way of example and not limitation, a particular infrared light source may emit light with a peak wavelength of 730 nm, 760 nm, 850 nm, 870 nm, or 940 nm. In some cases, commercial light sources such as LEDs may provide output at about 20 nm intervals with a center wavelength tolerance of +/−10 nm from the manufacturer's specified wavelength and thus one possible range of useful peak wavelengths for the light sources is 650 nm to 950 nm. The green light sources may be configured to emit light with wavelengths in the range of 495 nm to 570 nm. For example, a particular green light source may emit light with a wavelength of 528 nm. The green light sources may be equally spaced from light detectors as the pairs of red and infrared light sources. For example, if the distance between light detectors and a center of a first red light source is 2 mm, the distance between light detectors and a green light source may also be 2 mm (e.g., equidistant). In some other cases, the distance between the light detectors and one or more light sources is not equidistant. Further, in some embodiments, one or more of the light sources may comprise a single LED package that emits multiple wavelengths, such as green, red and infrared wavelengths, at the same or substantially the same (e.g., less than 1 mm difference) location with respect to multiple detectors. Such LEDs may include multiple semiconductor elements co-located using a single die in a single package.

The spacing of the light sources may be measured from the side of the light source or the center of the light source. For example, the light sources may be configured such that the center of each light source is at a first distance from the edge of the closest one of the light detectors. In some embodiments, the first distance may be 2 mm. In some implementations, each light source is located at a second distance from the closest one of the light sources, and each light detector is located at a third distance from the closest one of the light detectors. In some embodiments, the second and third distances are identical to the first distance. In other embodiments, each of the second and third distances is different from the first distance. The second distance may be identical to or different from the third distance. The particular magnitude of the spacing may depend on a number of factors and this disclosure does not limit the embodiments to any particular spacing. For example, spacing in a range of 1 mm (or less) to 10 mm would be workable in various embodiments.

In some embodiments, independent control of all light sources is provided. In other embodiments, several light sources are controlled together as a gang or bank. A benefit of independent control of each light source, or independent readout from each of multiple detectors (e.g., obtaining independent signals based on the same or different light wavelengths from each of multiple detectors), is that a multiple light path approach may be used to improve the estimation of HR and/or other physiological metrics, as discussed further herein.

Light detectors may comprise one or more sensors that are adapted to detect wavelengths of light emitted from the light sources. A particular light source combined with a particular detector may comprise a sensor such as a PPG sensor. A first PPG sensor and a second PPG sensor can share components, such as the same light sources and/or detectors, or have different components and thus the term "PPG sensor," in addition to having its ordinary meaning, may refer to any of such arrangements although actual embodiments may use multiple components in implementing a PPG sensor. The term "PPG device," in addition to having its ordinary meaning, may refer to a device including a PPG sensor. A light detector, in an embodiment, may comprise one or more detectors for detecting each different wavelength of light that is used by the light sources. For example, a first detector may be configured to detect light with a wavelength of 560 nm, a second detector may be configured to detect light with a wavelength of 940 nm, and a third detector may be configured to detect light with a wavelength of 528 nm. Examples include photodiodes fabricated from semiconductor materials and having optical filters that admit only light of a particular wavelength or range of wavelengths. The light detectors may comprise any of a photodiode, phototransistor, charge-coupled device (CCD), thermopile detector, microbolometer, or complementary metal-oxide-semiconductor (CMOS) sensor. The light detectors may comprise multiple detector elements, as further described herein. One or more of the detectors may comprise a bandpass filter circuit.

In other embodiments, a detector may comprise one or more detectors configured to detect multiple wavelengths of light. For example, a single detector may be configured to tune to different frequencies based on data received from an electrical digital microprocessor coupled to detectors. In another way, the single detector may include multiple active areas where each active area is sensitive to a given range of wavelengths. In an embodiment, a single detector is configured to detect light with wavelengths in the red and IR frequencies and a second detector is configured to detect light with wavelengths in the green frequencies. Further, each of the light sources may use any of one or more different wavelengths of light as previously described.

In an embodiment, light detectors can be mounted in a housing with one or more filters that are configured to filter out wavelengths of light other than wavelengths emitted by light sources. For example, a portion of the housing may be covered with a filter which removes ambient light other than light in wavelengths emitted by light sources. For example, signals from light sources may be received at the light detectors through an ambient light filter that filters out an ambient light source that generates an ambient light with a wavelength that is different from the wavelength that is detected by the detector. Although LEDs and photodiodes are used as examples of the light sources and the light detectors, respectively, the techniques described herein may be extended to other types of light sources. For example, edge emitting lasers, surface emitting lasers, LED-pumped phosphors that generate broadband light. The techniques described herein may be extended to other combinations of light sources and detectors. For example, the PPG device may include (i) single or multiple LEDs and a multi-element photodetector (e.g., a camera sensor), (ii) an LED array and single or multiple photodiodes, (iii) a broadband LED-pumped phosphor and detector array with wavelength selective filters on each detector, (iv) spatial light modulator (SLM) (e.g., a digital micromirror device [DMD] or a liquid crystal on silicon [LCoS] device) and single or multiple LEDs, other combinations thereof, or other configurations of light sources and detectors.

Certain flow diagrams are presented herein to illustrate various methods that may be performed by example embodiments. The flow diagrams illustrate example algorithms that may be programmed, using any suitable programming environment or language, to create machine code capable of execution by a CPU or microcontroller of the PPG device. In other words, the flow diagrams, together with the written description in this document, are disclosures of algorithms for aspects of the claimed subject matter, presented at the same level of detail that is normally used for communication of this subject matter among skilled persons in the art to which the disclosure pertains. Various embodiments may be coded using assembly, C, OBJECTIVE-C, C++, JAVA, or other human-readable languages and then compiled, assembled, or otherwise transformed into machine code that can be loaded into ROM, EPROM, or other recordable memory of the activity monitoring apparatus that is coupled to the CPU or microcontroller and then then executed by the CPU or microcontroller.

In an embodiment, signals obtained from multiple light paths may be processed to filter or reject signal components that are associated with motion of the user, using a computer program to identify the motion component of the signal and remove the identified motion component from the composite signal, leaving the cardiac component as a remainder or final signal.

In an embodiment, signals might be collected in variety of activities during day or at night, such as may relate to periods of walking, exercise, or sleep. Other on-device sensors including an accelerometer, gyroscope, or altimeter may be used to categorize or detect the activity, or human posture as a basis to develop the appropriate filters. These filters or signal processing methods might be used for targeted reduction of variability in the PPG data with multiple light paths. As an example and not limitation, the accelerometer data can be used to develop signal processing methods to filter the data and look into a certain posture, removing other body orientations. This can help reduce the noise in the data and get a better assessment of the corresponding physiological variables for the corresponding light paths.

In various embodiments, approaches discussed herein may be performed by one or more of: firmware operating on a monitoring or tracker device or a secondary device, such as a mobile device paired to the monitoring device, a server, host computer, and the like. For example, the monitoring device may execute operations relating to generating signals that are uploaded or otherwise communicated to a server that performs operations for removing the motion components and creating a final estimate value for HR, $SpO_2$, and/or other physiological metrics. Alternatively, the monitoring device may execute operations relating to generating the monitoring signals and removing the motion components to produce a final estimate value for HR, $SpO_2$, and/or other physiological metrics local to the monitoring device. In this case, the final estimate may be uploaded or otherwise communicated to a server such as host computer that performs other operations using the value.

An example monitoring or tracker device can collect one or more types of physiological and/or environmental data from one or more sensor(s) and/or external devices and communicate or relay such information to other devices (e.g., host computer or another server), thus permitting the collected data to be viewed, for example, using a web browser or network-based application. For example, while being worn by the user, a tracker device may perform biometric monitoring via calculating and storing the user's step count using one or more sensor(s). The tracker device may transmit data representative of the user's step count to an account on a web service (e.g., www.fitbit.com), computer, mobile phone, and/or health station where the data may be stored, processed, and/or visualized by the user. The tracker device may measure or calculate other physiological metric(s) in addition to, or in place of, the user's step count. Such physiological metric(s) may include, but are not limited to: energy expenditure, e.g., calorie burn; floors climbed and/or descended; HR; heartbeat waveform; HR variability; HR recovery; respiration, $SpO_2$, blood volume, blood glucose, skin moisture and skin pigmentation level, location and/or heading (e.g., via a GPS, global navigation satellite system (GLONASS), or a similar system); elevation; ambulatory speed and/or distance traveled; swimming lap count; swimming stroke type and count detected; bicycle distance and/or speed; blood glucose; skin conduction; skin and/or body temperature; muscle state measured via electromyography; brain activity as measured by electroencephalography; weight; body fat; caloric intake; nutritional intake from food; medication intake; sleep periods (e.g., clock time, sleep phases, sleep quality and/or duration); pH levels; hydration levels; respiration rate; and/or other physiological metrics.

An example tracker or monitoring device may also measure or calculate metrics related to the environment around the user (e.g., with one or more environmental sensor(s)), such as, for example, barometric pressure, weather conditions (e.g., temperature, humidity, pollen count, air quality, rain/snow conditions, wind speed), light exposure (e.g., ambient light, ultra-violet (UV) light exposure, time and/or duration spent in darkness), noise exposure, radiation exposure, and/or magnetic field. Furthermore, a tracker device (and/or the host computer and/or another server) may collect data from one or more sensors of the device, and may calculate metrics derived from such data. For example, a tracker device may calculate the user's stress or relaxation levels based on a combination of HR variability, skin conduction, noise pollution, and/or sleep quality. In another example, a tracker device may determine the efficacy of a medical intervention, for example, medication, based on a combination of data relating to medication intake, sleep, and/or activity. In yet another example, a tracker device may determine the efficacy of an allergy medication based on a combination of data relating to pollen levels, medication intake, sleep and/or activity. These examples are provided for illustration only and are not intended to be limiting or exhaustive.

An example monitoring device may include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. A monitoring system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method, comprising:
enabling data to be transmitted over a connection between a master device and a slave device, the connection allowing for wireless data transmission using an initial set of values for a plurality of connection parameters for the connection;
receiving, from an application executing on the master device to a controller on the slave device, a request to modify the connection;
determining, by the controller and using a policy for the connection, that the request is able to be performed by the controller, the policy specifying, based at least in part on historical data, a maximum frequency for changing the values for the plurality of connection parameters; and
modifying, by the controller on the slave device, the connection per the request from the application executing on the master device.

2. The method of claim 1, further comprising:
receiving the request via an application programming interface (API) exposed by the slave device.

3. The method of claim 1, wherein the request to modify the connection involves adjusting one or more connection parameter values or performing a disconnect action.

4. The method of claim 1, wherein an operating system operating on the master device restricts the application from requesting the modification be performed by the master device.

5. The method of claim 1, wherein the controller further receives one or more additional requests from one or more applications or subsystems on the slave device, and wherein the controller determines whether to modify the connection per the request based at least in part upon the one or more additional requests.

6. The method of claim 1, wherein the request from the application executing on the master device is triggered by a command received from a remote computing device.

7. The method of claim 1, wherein the connection is a Bluetooth® connection, and wherein the policy ensures, at least in part, that the connection conforms to a standard for the Bluetooth® connection.

8. The method of claim 1, wherein the master device is a master to the slave device only with respect to the connection.

9. The method of claim 1, further comprising:
determining that no subsequent requests are received for a determined length of time; and
reverting from the requested modification to the connection.

10. The method of claim 1, wherein the connection parameters include at least a connection interval, a maximum transmission unit (MTU), or a communication latency.

11. A device, comprising:
a processor; and
memory storing instructions that, when executed by the processor, cause the device to:
enable data to be transmitted over a connection between a master device and a slave device, the connection allowing for wireless data transmission using an initial set of values for a plurality of connection parameters for the connection;
receive, from an application executing on the master device to a controller on the slave device, a request to modify the connection;
determine, by the controller and using a policy for the connection, that the request is able to be performed by the controller, the policy specifying, based at least in part on historical data, a maximum frequency for changing the values for the plurality of connection parameters; and
modify, by the controller on the slave device, the connection per the request from the application executing on the master device.

12. The device of claim 11, wherein the instructions when executed further enable the device to:
receive the request via an application programming interface (API) exposed by the device.

13. The device of claim 11, wherein the request to modify the connection involves adjusting one or more connection parameter values or performing a disconnect action.

14. The device of claim 11, wherein an operating system operating on the master device restricts the application from requesting the modification be performed by the master device.

15. The device of claim 11, wherein the controller further receives one or more additional requests from one or more applications or subsystems on the device, and wherein the controller determines whether to modify the connection per the request based at least in part upon the one or more additional requests.

16. The device of claim 11, wherein the connection is a Bluetooth® connection, and wherein the policy ensures, at least in part, that the connection conforms to a standard for the Bluetooth® connection.

17. A non-transitory computer-readable storage medium including instructions that, when executed by a processor, cause the processor to:
    enable data to be transmitted over a connection between a master device and a slave device, the connection allowing for wireless data transmission using an initial set of values for a plurality of connection parameters for the connection;
    receive, from an application executing on the master device to a controller on the slave device, a request to modify the connection;
    determine, by the controller and using a policy for the connection, that the request is able to be performed by the controller, the policy specifying, based at least in part on historical data, a maximum frequency for changing the values for the plurality of connection parameters; and
    modify, by the controller on the slave device, the connection per the request from the application executing on the master device.

18. The non-transitory computer-readable storage medium of claim 17, wherein the instructions when executed further cause the processor to:
    receive the request via an application programming interface (API) exposed by the slave device.

19. The non-transitory computer-readable storage medium of claim 17, wherein the request to modify the connection involves adjusting one or more connection parameter values or performing a disconnect action.

20. The non-transitory computer-readable storage medium of claim 17, wherein the connection is a Bluetooth® connection, and wherein the policy ensures, at least in part, that the connection conforms to a standard for the Bluetooth® connection.

\* \* \* \* \*